United States Patent
Yue et al.

(10) Patent No.: US 8,488,498 B2
(45) Date of Patent: Jul. 16, 2013

(54) RETRANSMISSION PROTOCOL AND CODING SCHEME FOR MULTICAST BROADCAST SERVICE

(75) Inventors: Guosen Yue, Princeton, NJ (US); Xiadong Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 244 days.

(21) Appl. No.: 12/859,453

(22) Filed: Aug. 19, 2010

(65) Prior Publication Data

US 2011/0064015 A1 Mar. 17, 2011

Related U.S. Application Data

(60) Provisional application No. 61/237,820, filed on Aug. 28, 2009.

(51) Int. Cl.
*H04B 7/00* (2006.01)
(52) U.S. Cl.
USPC .......................................................... 370/310

(58) Field of Classification Search
None
See application file for complete search history.

(56) References Cited

U.S. PATENT DOCUMENTS

| | | | | |
|---|---|---|---|---|
| 7,778,978 | B2 * | 8/2010 | Chindapol et al. | 707/690 |
| 7,940,712 | B2 * | 5/2011 | Larsson | 370/312 |
| 7,941,724 | B2 * | 5/2011 | Chindapol et al. | 714/751 |
| 8,024,633 | B2 * | 9/2011 | Hafeez et al. | 714/748 |
| 2002/0144209 | A1 * | 10/2002 | Ariel et al. | 714/792 |
| 2002/0146074 | A1 * | 10/2002 | Ariel et al. | 375/240.27 |
| 2002/0157058 | A1 * | 10/2002 | Ariel et al. | 714/774 |
| 2007/0253423 | A1 * | 11/2007 | Chindapol et al. | 370/394 |
| 2008/0282125 | A1 * | 11/2008 | Hafeez et al. | 714/748 |
| 2008/0294959 | A1 * | 11/2008 | Chindapol et al. | 714/752 |
| 2009/0177954 | A1 * | 7/2009 | Takahashi et al. | 714/819 |
| 2009/0307559 | A1 * | 12/2009 | Wu et al. | 714/749 |
| 2010/0061287 | A1 * | 3/2010 | Josiam et al. | 370/312 |
| 2010/0128650 | A1 * | 5/2010 | Morimoto et al. | 370/312 |
| 2010/0290383 | A1 * | 11/2010 | Wu et al. | 370/312 |

* cited by examiner

*Primary Examiner* — Fan Ng
(74) *Attorney, Agent, or Firm* — Jeffery Brosemer; Joseph Kolodka

(57) ABSTRACT

A method for the retransmission and coding of multicast broadcast services.

7 Claims, 10 Drawing Sheets

RETRANSMISSION PROTOCOL AND CODING SCHEME FOR MULTICAST BROADCAST SERVICE

CROSS REFERENCE TO RELATED APPLICATION

This application claims the benefit of U.S. Provisional Patent Application No. 61/237,820 filed Aug. 28, 2009 which is incorporated by reference as if set forth at length herein.

FIELD OF DISCLOSURE

This disclosure relates to the field of telecommunications and in particular to a retransmission protocol and coding scheme for multicast broadcast service(s).

BACKGROUND OF DISCLOSURE

A multicast broadcast service is a point-to-multipoint communications method whereby identical data packets are transmitted simultaneously to multiple receiver nodes. As may be appreciated, receiver nodes may encounter packet losses—for example—due to channel impairments. As a result, retransmission of affected packets is oftentimes required.

A characteristic of such a retransmission scheme when used with a multicast service is that since each receiver generally experiences a different quantity of packet loss(es), a large number of retransmissions are required for each and every receiver to recover all lost packets. As is known in the art, the number of retransmissions can be reduced significantly if a coding scheme is employed which generates the retransmitted packets by an encoding across information packets. Advantageously such schemes enable each receiver to recover packets destined for that receiver based upon the received packets.

For example, in a paper entitled "ON THE MINIMUM NUMBER OF TRANSMISSIONS IN SINGLE-HOP WIRELESS CODING NETWORKS", which appeared in PROC. IEEE INFORM. THEORY WORKSHOP, at Lake Tahoe, Calif. on September 2007, pp. 120-125, S.Y EL REOUAYHEB, M. A. R. CHAUDHRY, and A. SPRINTSON described a fundamental problem associated with finding an optimal encoding of broadcasted packets to minimize the overall number of retransmissions. Notably, the authors assumed in that a transmitter knows the indices of lost packets for every receiver, which unfortunately requires a large overhead on the uplink feedback channel. In "NETWORK CODING-BASED RETRANSMISSION SCHEMES FOR E-MBS WITH AND WITHOUT MS FEEDBACK", which appeared in IEEE C802.16.m-090072r1, made available at URL http://wirelessman.org/tgmcontrib/C80216m-09.0072r1.ppt, H. XU, S. XU, N. ARULSELVAN, and S. KALYANASUNDARAM describe several network coding-based retransmission schemes for a broadcast service without requiring feedback from receive nodes.

Notwithstanding these developments, an improved retransmission and coding scheme for multicast broadcast services would represent a significant advance in the art.

SUMMARY OF DISCLOSURE

An advance is made in the art according to an aspect of the present disclosure directed to a coding scheme and nested code structure for retransmissions in multicast broadcast service, where each packet is broadcast to multiple destination nodes within a certain area. According to an aspect of the present disclosure, an encoder operates across multiple broadcast packets thereby generating redundant packets such that lost packets may be recovered. And while different destination nodes encounter different amounts of packet loss, they are nevertheless able to recover lost packets that affect the particular destination node(s), as a result of the broadcast redundant packets sent during normal retransmission slots.

BRIEF DESCRIPTION OF THE DRAWING

A more complete understanding of the disclosure may be realized by reference to the accompanying drawing in which.

DESCRIPTION OF EMBODIMENTS

Figure 1:
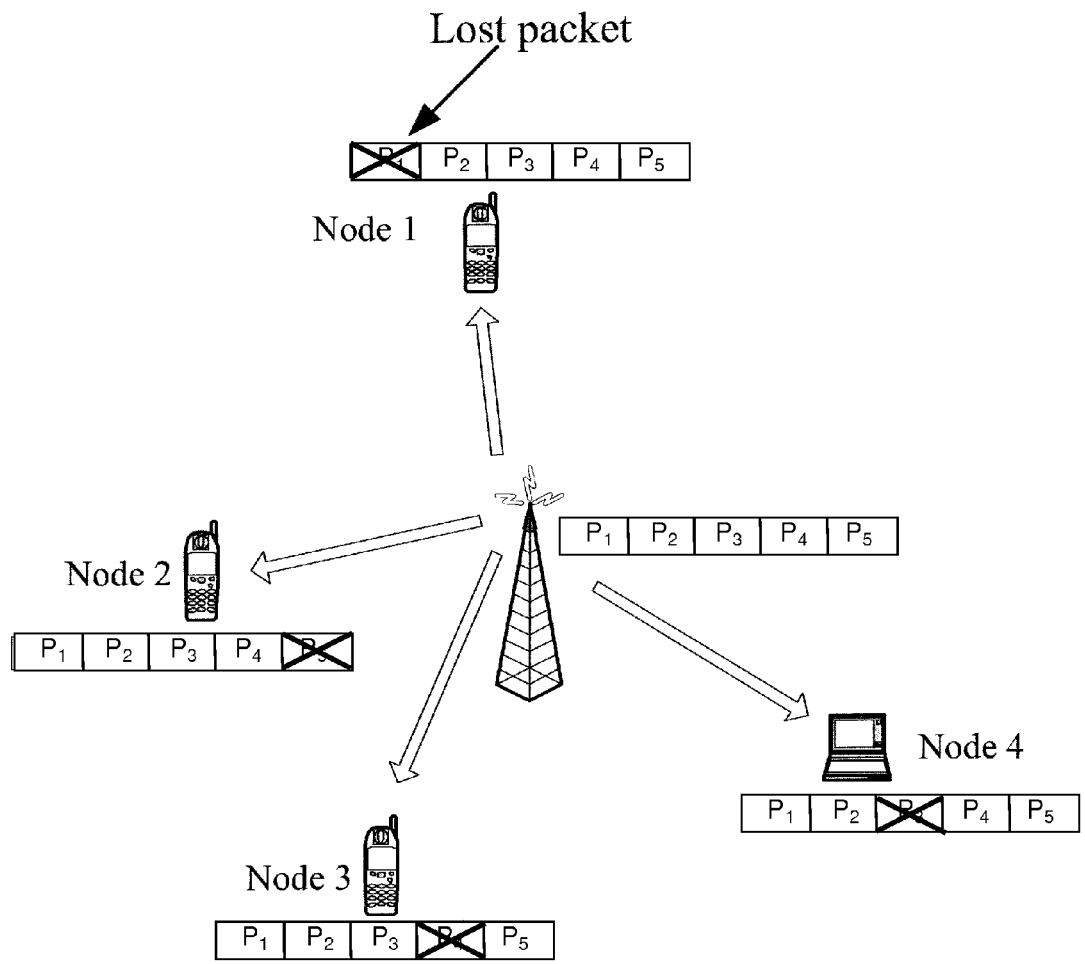
FIG. 1 is a schematic diagram depicting a point-to-multipoint data packet broadcast system.

The following merely illustrates the principles of the various embodiments. It will thus be appreciated that those skilled in the art will be able to devise various arrangements which, although not explicitly described or shown herein, embody the principles of the embodiments and are included within their spirit and scope.

Furthermore, all examples and conditional language recited herein are principally intended expressly to be only for pedagogical purposes to aid the reader in understanding the principles of the embodiments and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGs. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent as those shown herein.

Unless otherwise explicitly specified herein, the drawings are not drawn to scale.

By way of some additional background, we consider a wireless network comprising one server transmitter and K receiver nodes or mobile users that receive a broadcast service transmitted by the server. As shown in FIG. 1, the same sequence comprising L data packets of equal length, $P_1, \ldots, P_L$, are transmitted from the server to K receivers. However, due to channel impairments, each receiver node experiences a different packet loss.

We denote $U_k$ as a set of lost packets for the kth receiver. For example, as shown in FIG. 1, we have $U_1=\{P_1\}$, $U_2=\{P_5\}$, $U_3=\{P_4\}$, and $U_4=\{P_3\}$. Without a network coding scheme, the lost packets $\{P_1, P_3, P_4, P_5\}$ have to be retransmitted—one by one. Therefore, at least four retransmissions are required if no additional loss is incurred of the retransmitted packets.

If however, lost packets are known to the transmitter, we can retransmit the data packet which is binary coded from the original data packets $\{P_i\}$. For example, we obtain $R_1$ by binary XORing the lost four packets, given by $$R_1 = P_1 \oplus P_3 \oplus P_4 \oplus P_5 \qquad (1)$$

where $\oplus$ denotes the binary addition of every bit in the packet. With the retransmitted packet $R_1$, each receiver node can recover a lost packet since the remaining three packets are received at this receiver node. Therefore, only one retransmission is required.

However, this retransmission coding scheme assumes that the set of lost packets $U_k$, $k=1, \ldots, K$ are known to the transmitting server. As may be appreciated, such informational knowledge incurs a large overhead on the uplink feedback channel. To fully eliminate the uplink feedback channel the following coding schemes were described by H. XU et al.

More particularly, a basic coding scheme that does not employ any feedback of lost packets is described as follows. The server first transmits L data packets. After the L packets are transmitted, there is a retransmission interval of Q packet-slots where Q<L. Based on the permuted order of original L data packets, resulting in the order of $P_1, \ldots, P_L$, the retransmission packet $R_i$, $i=1, \ldots, Q$, is obtained by $$R_i = P_{(i-1)\lceil \frac{L}{Q} \rceil + 1} \oplus P_{(i-1)\lceil \frac{L}{Q} \rceil + 2} \oplus \cdots \oplus P_{i\lceil \frac{L}{Q} \rceil}. \qquad (2)$$

If one receiver node received $$\left\lceil \frac{L}{Q} \right\rceil - 1$$

packets among $$\left\{ P_{(i-1)\lceil \frac{L}{Q} \rceil + j}, \quad j = 1 \ldots \left\lceil \frac{L}{Q} \right\rceil \right\},$$

it can then recover the single lost packet by receiving $R_i$ even if each receiver node has a different single lost packet from one another. Since the above coding scheme is fixed for the original transmitted L packets and it does not depend on the lost packet sets $\{U_k\}$, no feedback is required.

Two variations of the above basic coding scheme are also described by H. XU et al. namely, 1) a Truncated Sequence scheme and 2) a Random Linear Code scheme.

1. Truncated Sequence: In this scheme, d packets are dropped from the original L packets. With permuted packet sequence of the rest L-d packets, the above basic scheme is employed to obtain the retransmission sequence $R_1, \ldots, R_Q$ by encoding $$\left\lceil \frac{L-d}{Q} \right\rceil$$

packets at a time.

2. Random Linear Code: In this scheme, a linear combination (binary XOR) of L/Q packets that are randomly selected from the original L packets are sent over the broadcast channel for each retransmission. The receiver node may wait until all retransmissions are completed before starting to decode.

As we now know however, the above coding schemes do not perform particularly well with respect to packet recovery. Advantageously—and according to the present disclosure—a different low-complexity coding scheme is employed for retransmissions in the broadcast service without incurring much overhead.

More particularly, given L original data packets, we encode them according to the present disclosure to obtain M retransmission packets as follows. First, the original L data packets are grouped into $2^M$ sets, i.e., $\Omega_0, \ldots, \Omega_{2^M-1}$. A retransmission packet $R_m$ for the ith retransmission is obtained by $$R_m = \Sigma \oplus_{P_l \in V_m} P_l, \text{ with } V_m = \{\Omega_j, j_{bin}(m)=1\},$$

where $\Sigma\oplus$ denotes binary summation and $j_{bin}$ (m) denotes the mth bit of binary representation of j. Stated alternatively, $R_m$ is obtained by binary XORing the data packet $P_i$ if $P_i \in \Omega_j$ and the mth bit of binary representation of j is one. Packets in $\Omega_0$ are not encoded to any retransmission packet. Therefore, they are dropped for the retransmission.

Figure 2:
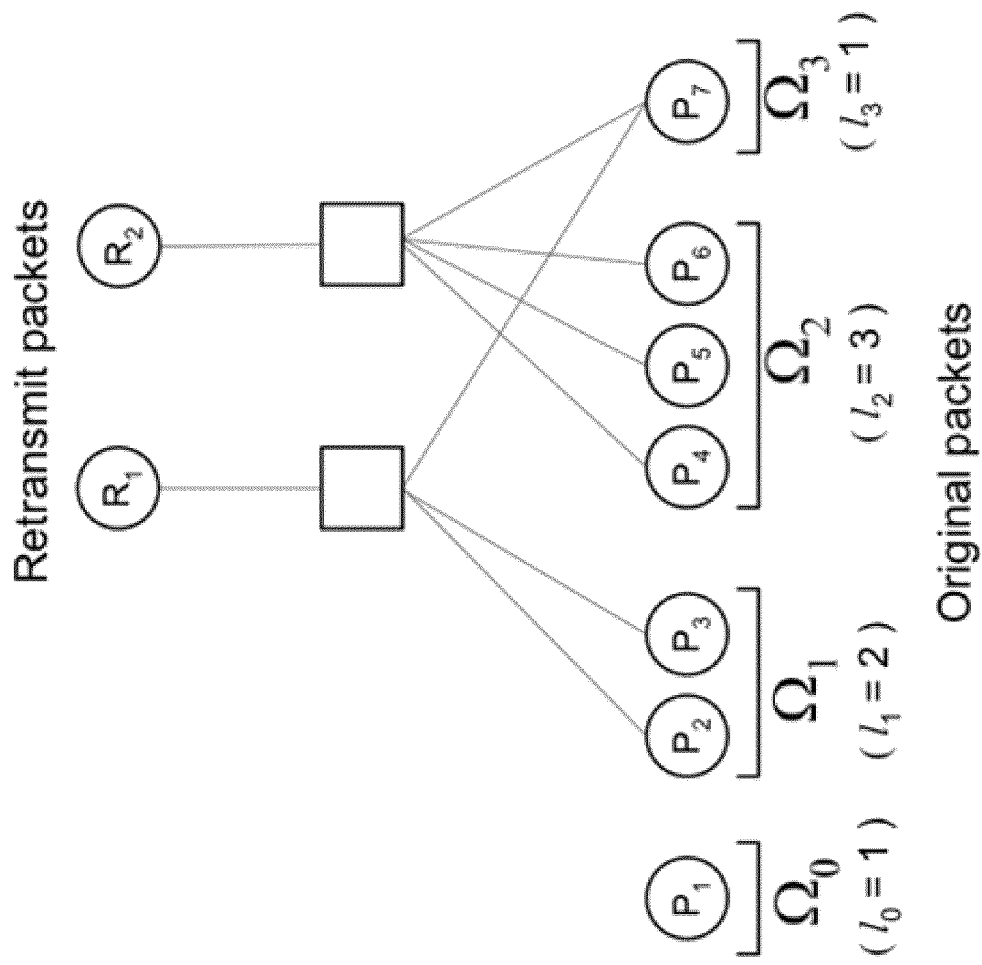
FIG. 2 is a schematic diagram depicting an example of a coding structure for M=2 according to an aspect of the present disclosure.

As may be appreciated, a linear block code may be represented by a bipartite graph comprising two types of nodes —variable nodes representing code bits and check nodes representing parity check constraints. One example of a code graph representation for the above coding scheme is illustrated in FIG. 2 for M=2.

To recover lost packets, we consider the iterative message-passing decoding algorithm on the code graph similarly as the low-density parity-check (LDPC) decoder. As may be appreciated, such a scheme is a more general coding scheme. Since the encoding rules are based on the node sets $\{\Omega_j\}$, we need to design the code structure, i.e., to design the variable node sets $\{\Omega_j\}$ to achieve good performance.

Code Design

With M redundant packets, the overall number of packets is N=L+M. We assume that when a number of erasures i>M, none of lost packet can be recovered. If all L packets are encoded to M redundant packet, i.e., $\Omega_0=\emptyset$, given the packet loss rate p, the packet error rate after decoding is given by the following relationship:

$$P_{b|M} = \sum_{i=M+1}^{N} \frac{i}{N} P_i^{(N)} + \sum_{i=0}^{M} \sum_{E} Pr(E|i) P_i^{(N)} \frac{n_a(E)}{N}, \quad (4)$$

where E denotes a particular decoding error event, Pr(E|i) is then the probability of a particular decoding error event conditioned on the number of lost packets i, and $n_a(E)$ denotes the number of unrecovered packets for that decoding error event. The probability of losing n packets, $P_i^{(N)}$, is given by the following relationship:

$$P_i^{(N)} = \binom{N}{i} p^i (1-p)^{N-i}, \quad (5)$$

In contrast to the prior art techniques, we consider a more general case by assuming n–M (n≦N) packets among L packets are encoded to M redundant packets for retransmissions. Therefore, we have $|\Omega_0|=N-n$. The packet error rate is then given by the following relationship:

$$P_{b|M} = \frac{1}{N}\left(\sum_{i=M+1}^{n} i P_i^{(n)} + \sum_{i=0}^{M}\sum_{E} Pr(E|i) P_i^{(n)} n_a(E) + (N-n)p\right). \quad (6)$$

Before we consider the design of the code structure however, we first investigate the effect of $\Omega_0$.

Effect of $\Omega_0$

To fully understand the effect of $\Omega_0$—or more precisely—the size of $\Omega_0$, we assume that the ideal erasure code, i.e., maximum distance separable (MDS) code, is employed so that when the number of lost packets i≦M, all lost packets can be recovered. The packet error rate is then given by $$P_{b|M} = \frac{1}{N}\left(\sum_{i=M+1}^{n} C_n^i p^i(1-p)^{n-i} i + (N-n)p\right) \quad (7)$$

$$= \frac{1}{N}\left(np - \sum_{i=1}^{M} C_n^i p^i(1-p)^{n-i} i + (N-n)p\right)$$

$$= p - \frac{1}{N}\sum_{i=1}^{M} C_n^i p^i(1-p)^{n-i} i.$$

Therefore the optimal n can be obtained by minimizing $p_b$, given by $$n^*_{|M} = \underset{\delta}{\operatorname{argmin}} P_b = \underset{n}{\operatorname{argmax}} \sum_{i=1}^{M} C_n^i p^i(1-p)^{n-i} i, \text{ s.t. } n \leq N. \quad (8)$$

With the continuous relaxation of an integer optimization, we then obtain $$n^*_{|M} = \min\{\text{round}(x^*), N\}, \quad (9)$$

where x* is one of real and positive solutions of f'(x)=0 that maximizes f(x) and f'(x) is the derivative of f(x), given by $$f(x) = \sum_{i=1}^{M} \frac{\prod_{j=0}^{i-1}(x-j)}{i!} p^i(1-x)^{x-i} i. \quad (10)$$

For small M, we can obtain the $n^*_{|M}$ analytically. For example, when M=1, we have $$P_{b|M=1} = \frac{1}{N}\left(\sum_{i=2}^{n} C_n^i p^i(1-p)^{n-i} i + (N-n)p\right) \quad (11)$$

$$= \frac{1}{N}(np - C_n^1 p(1-p)^{n-1} + (N-n)p)$$

$$= p - \frac{n(1-p)^{n-1}}{N}.$$

We can then optimize n that minimizes $p_b$, given by $$n^*_{|M=1} = \underset{n}{\operatorname{argmin}} P_b = \underset{n}{\operatorname{argmax}} \frac{n(1-p)^{n-1}}{N}, \text{ s.t. } n \leq N. \quad (12)$$

With the continuous relaxation of an integer optimization, we then obtain $$n^*_{|M=1} = \min\left\{\text{round}\left(-\frac{1}{\log(1-p)}\right), N\right\}. \quad (13)$$

We can see from (13) that when $$p > 1 - e^{-\frac{1}{N}},$$

there should be some nodes in $\Omega_0$ which are not used for generating the redundant packets.

For M=2, under assumption of MDS code, we have $$P_{b|M=2} = p - \frac{1}{N}\left(np(1-p)^{n-1} + n(n-1)p^2(1-p)^{n-2}\right). \quad (14)$$

Similarly, we optimize n to obtain $$n^*_{|M=2} = \quad (15)$$

$$\underset{n}{\operatorname{argmin}} P_b = \underset{n}{\operatorname{argmax}} np(1-p)^{n-1} + n(n-1)p^2(1-p)^{n-2} \text{ s.t. } n \le N.$$

With the continuous relaxation of the integer n, we obtain $n^*_{|M=2}$ given by (9) and x* is one of the real and positive solutions of $$p\log(1-p)x^2 + (2p + (1-2p)\log(1-p))x + 1 - 2p = 0 \quad (16)$$

And similarly, we can obtain the optimal n for M=3 given by (9), where x* is one of the real and positive solutions of $$\frac{\kappa^2}{2}\log(1-p)x^3 + \left(\kappa\log(1-p) + \frac{3\kappa^2}{2}(1-\log(1-p))\right)x^2 + \quad (17)$$
$$(\log(1-p) + (2-\log(1-p))\kappa + (-3+\log(1-p))\kappa^2)x +$$
$$1 - \kappa + \kappa^2 = 0,$$

where $$\kappa = \frac{p}{1-p}.$$

For M≥4, we can obtain the solutions of f'(x)=0 numerically.

Iterative Code Design Method

From the definition of code graph $\{\Omega_j\}$, we can see that the design of short codes can only be considered with a small M since the number of sets $\{\Omega_j\}$ increases exponentially as M increases, which causes difficulty on the code design. We can see that the code structure is defined by the code graph. However, particular nodes or packets in the set $\Omega_j$ are not important. Therefore, to design the code, we only need to find the size of $\Omega_j$ and then group the nodes into these disjoint sets. Denote $l_j = |\Omega_j|$. Therefore, we only need to design the set $L_M \triangleq \{l_0, \ldots, l_j\}$. Based on the graph representation shown in FIG. 2, the coded packets for retransmissions are connected with only one check node each. Therefore, $R_i$ can be grouped into the set $\Omega\mathbf{2}_{i-1}$ and form $\Omega'_{2^{i-1}}$. The new sets can be defined as follows:

$$\Omega'_j = \Omega_j \cup \{R_i\}, \text{ for } j = 2^{i-1},$$

$$\Omega'_j = \Omega_j, \text{ otherwise.} \quad (18)$$

If we let $l'_j = |\Omega'_j|$, the code design then becomes the design of the set $L'_M = \{l'_0, \ldots, l'_{2^M-1}\}$ to minimize the packet error rate $P_{b|M}$ in (6) with additional constraints $l'_{2^{i-1}} \ge 1$, i=1, ..., M. We then consider a similar residual graph based code design approach.

More particularly, for M=1, there is only two sets $\Omega'_0$ and $\Omega'_1$. We perform single parity-check (SPC) to all nodes in $\Omega'_1$ and retransmit it. The only thing we need to decide is how many nodes to put in $\Omega'_1$. Since the SPC code is a trivial MDS code, the packet error rate is the same as $P_{b|M=1}$ given in (11). Therefore, we have $$L'_1 = \left\{ l'_1 = \operatorname{round}\left(-\frac{1}{\log(1-p)}\right), l'_0 = N - l'_1 \right\}.$$

For M=2, n−2 data packets are encoded to obtain 2 retransmission packets. The optimized code is $$\left\{l'_j = \frac{n}{3} \text{ or } \frac{n}{3}\right\}$$

with $\Sigma_{j=1}^3 l'_j = n$. Based on the residue graph, the packet error rate is then given by $$P_{b|M=2} = \frac{1}{N}\left(\sum_{i=3}^n C_n^i p^i(1-p)^{n-i} + (N-n)p + 2p^2(1-p)^{n-1}\left(\sum_{j=1}^3 l'_j - n\right)\right) \quad (19)$$

$$= p - \frac{1}{N}\left(np(1-p)^{n-1} + n(n-1)p^2(1-p)^{n-2} + 2p^2(1-p)^{n-2}\left(\sum_{j=1}^3 l'_j - n\right)\right).$$

Therefore $l'_0 = n^* = \operatorname{round}(x^*)$, where x* is the solution of $$\frac{1}{3}\kappa\log(1-p)x^2 + \quad (20)$$
$$\left(\log(1-p) + \frac{2}{3}\kappa + \kappa\log(1-p)\right)x + (1+\kappa) = 0$$

For M=3, 4, 5, we first obtain all possible residue graphs for every error event and the corresponding probability Pr(E|i), as well as the number of residual graphs corresponding to the particular number of unrecoverable errors $n_a$. We then evaluate the performance $P_{b|M}$ given in (6) for a given code graph $L'_M$.

To design the code graph $L'_M$ for M=3, 4, 5, we apply the following iterative algorithm to consider the case of $\Omega_0$.

Algorithm 1. [Low-complexity iterative code design algorithm]

For i = 0,···, $2^M - 1$, do
- Let $l'_i = N$ and $l'_j = 0, \forall j \neq i$.
- For k = 1,···, $N_0$, where $N_0 = N - 1$ if k = $2^{j-1}$, j = 1,···,M, otherwise $N_0 = N$, do
  - $l'_i \leftarrow l'_i - 1$
  - Compute the $P_b(L'_j)$ where
    $L'_j \triangleq \{l'_0,···,l'_{j-1},l'_j + 1,l'_{j+1},···,l'_{2^M-1}\}$, for j = 1,···, $2^M - 1$.
  - Find $j^* = \text{argmin}_j P_{b|M}(L'_j)$ from (6) with n = $\Sigma_{j-1}^{2^M-1} l'_j$.
  - $l'_{j^*} \leftarrow l'_{j^*} + 1$
- Output the result $L'^*_i = \{l'_1,···,l'_{2^M-1}\}$.
- The final result is then given by $L'^* = \text{argmin}_{L'^*_i} P_b(L'^*_i)$.

With L'* we then obtain L* by letting $l_{2^{i-1}} = l'_{2^{i-1}}+1$, i=1, ..., M and $l_j = l'_j$, otherwise. Note that although the code design is based on a certain p, we find that for a given L, the resulting optimized codes are the same for a certain range of p. For the retransmission without any feedback in the multicast broadcast service, we can arbitrarily choose the code resulting from the code optimization for any range of p. Of course, if we allow a very small amount of feedback, e.g., feedback of p, we can choose the designed code optimized exactly for such p.

Nested Code Structure

As previously discussed, the designed code with M redundant nodes provides M retransmissions. Since we can only design for a small M, for general cases with more than M transmissions, we can simply concatenate it with any other codes to generate more redundant packets for retransmission, or preferably employ a nested code structure as follows.

When we design the code to obtain M redundant packets, we do not fix the order of the packet sequence $P_1, ..., P_L$. We can randomly group the nodes based on the design results L*. To obtain the redundant packets with nested code structure, we have to fix the order of the packet sequence first.

Without a loss of generality, we assume that the order packet sequence is $P_1, ..., P_L$. Based on the designed graph $L^*_M = \{l_0, ... l_{2^M-1}\}$, we first group L packets by $$\Omega_j = \{P_{\Sigma_{i=0}^{j-1} l_i + 1}, ..., P_{\Sigma_{i=0}^{j} l_i}\}$$

and then encode them to generate M redundant packets based on $\{\Omega_j\}$. To generate additional M redundant packets, we first cyclically shift the ordered packet sequence $P_1, ..., P_L$ by T times and obtain packet sequence $P_1^{(1)}, .., P_L^{(1)}$ with $P_i^{(1)} = P_{i+T \bmod L}$. We then perform the grouping based on the shifted packet sequence $P_i^{(1)}$ and encode them in the same way.

Figure 3:
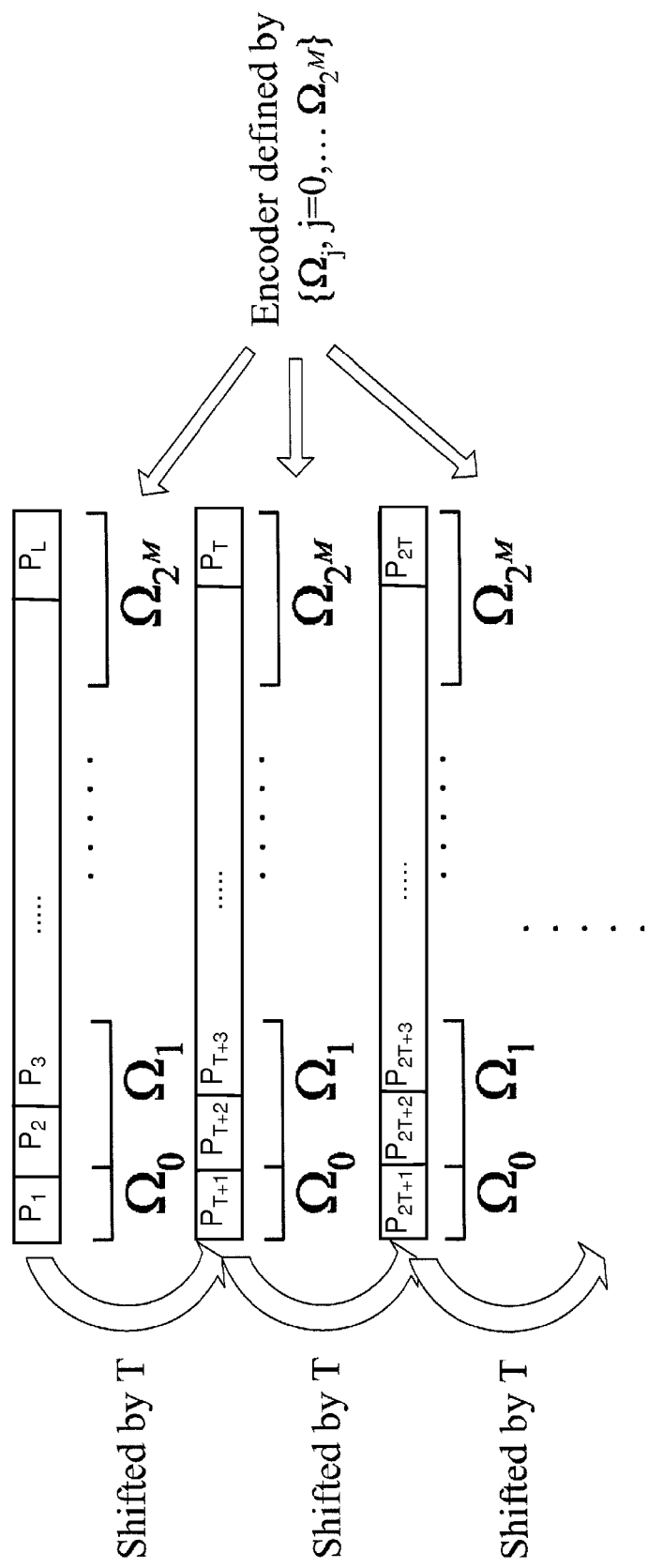
FIG. 3 is a schematic diagram depicting a nesting coding structure using cyclic shifts according to an aspect of the present disclosure.

As shown in FIG. 3, for every stage of T cyclic shifts, we can generate M redundant packets for retransmissions. By performing the shifts, we can generate as many as redundant packets as we want. However, there will be repetitions among the redundant packets. If we choose T such that L and T are coprime, we can obtain LM distinct redundant packets.

As may be appreciated, a simple choice is letting T=1. However, since usually the number of retransmissions Q ≪ LM and it is preferable to allow the nodes in $ga_0$ to be protected by some redundant packets soon, we choose a large T. We can also choose different cyclic shift parameters for every shift stage, i.e., $T_i$ for the ith stage of cyclic shifts. Moreover, a high rate precoder may be included to improve the performance, e.g., $P_1, ..., P_L$ are first encoded to $P'_1, ..., P'_L, ..., P'_{L+\Delta_L}$. We then perform the encoding and the nested coding on the packet sequence $P'_1, ..., P'_{L+\Delta_L}$.

Another variation is that in each stage of nested encoding, we can encode the original packets and the redundant packets that are already generated together, i.e., at the qth stage, we can encode the packets $P_1, ..., P_L$, and $R_1, ..., R_{(q-1)M}$ together with designed codes of different lengths. Another improvement can be done by adding an interleaver for each stage—meaning that the order is changed at each coding stage. The interleaver may only cover the packets for the encoders, i.e., $P_i$ in any set except $\Omega_0$.

Numerical Results

Figure 4:
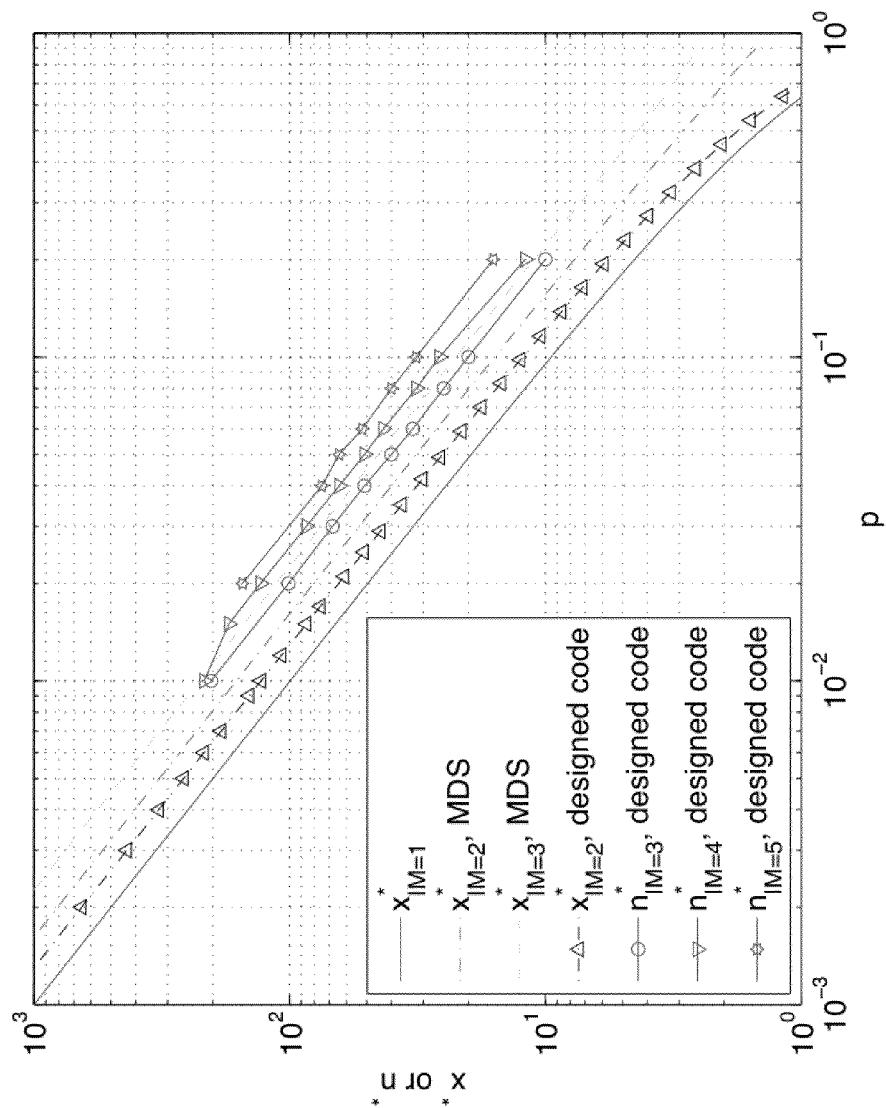
FIG. 4 is a graph showing x* or n* as a function of packet error rate p for various M.

FIG. 4 shows the resulting x* or n* as a function of packet error rate p for various M. For M=1, 2, and 3, we provide the results of x* for ideal MDS codes. We also present in FIG. 4 the analytical results x* for designed codes with M=2 and the numerical results n* for designed codes with M=3, 4, and 5. We can see for N=100, the corresponding error rate is p*=0.01, 0.0161, and 0.226 for M=1, 2, and 3, respectively, for ideal MDS codes, indicating that when p<p*, the size of $\Omega_0$ becomes zero.

For the designed codes, the error rate thresholds p* are 0.0129, 0.0202, 0.0259, and 0.0302 for M=2, 3, 4, and 5, respectively. We find that within a large range of p, the resulting x* (p) is close to a linear function in the log domain. Therefore, we can apply the linear approximation (LA) to ln x* (or ln n*) with respect to ln p, i.e., ln x*=a ln p+b, where a, b are the LA parameters.

Figure 5:
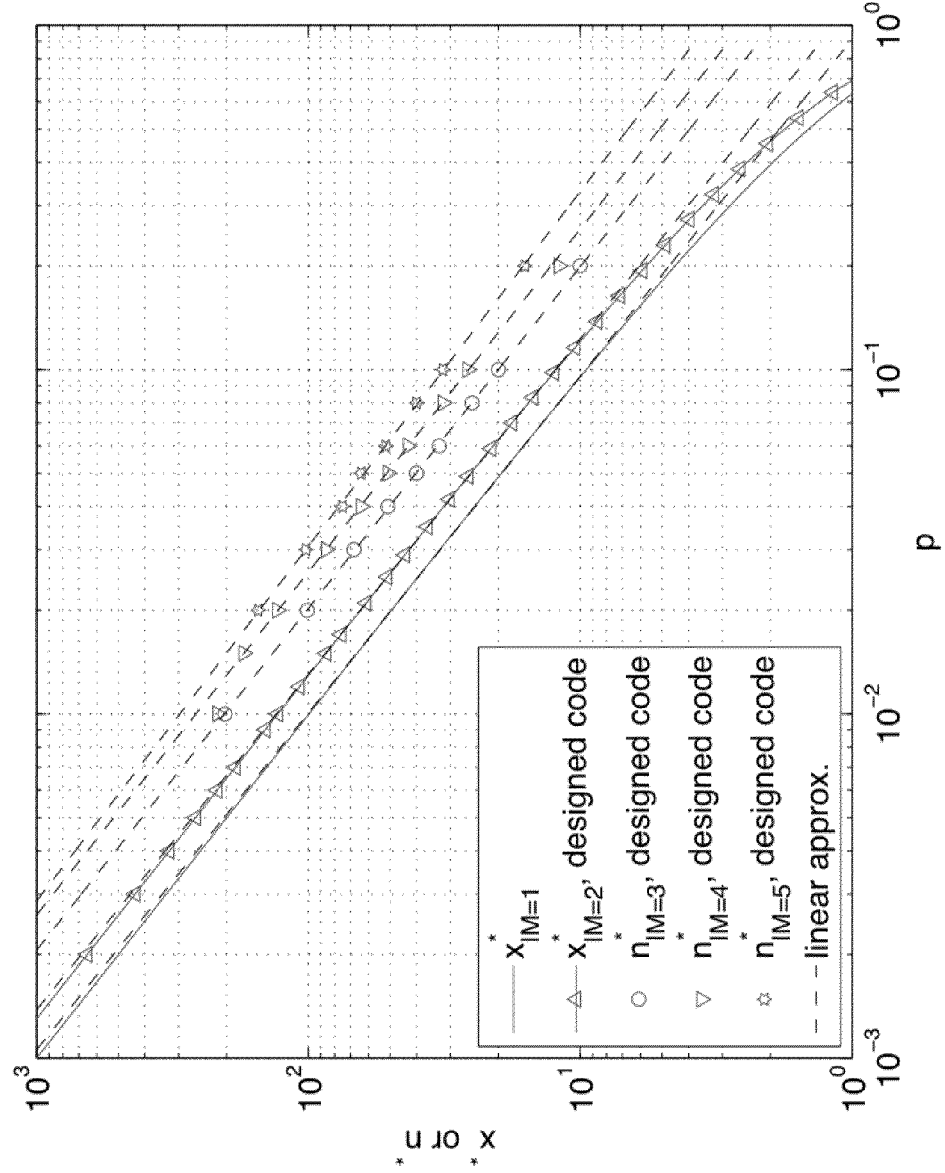
FIG. 5 is a graph showing the performance of linear approximation.

The results of (a, b) for the designed codes with various M are listed in Table 1. The performance of LA is shown in FIG. 5. We can see that the LA provides very good approximations. With the LA approximation we can obtain n* and consequently $l_0$ easily. We then apply the simple design method to obtain the codes which is summarized as follows:

Equally assign Z nodes to $\Omega'_j$, $\forall j$, i.e., $l_j^* = Z$, where $$Z = \lfloor n^*/(2^M - 1) \rfloor.$$

For the rest $n^* - (2^M - 1)Z$ nodes, $n^* - (2^M - 1)Z < 2^M - 1$, we assign one per set based on the ascending order of the Hamming weight of the binary expansion of j.

With above method, we obtain so-called quasi-regular codes since the values of $l_j$, j=1, ..., $2^M - 1$ are almost the same.

We now evaluate the packet recovery performance using the nested coding structure with designed code for the multicast broadcast service. We consider that one server services 10 users, i.e., there are K=10 receive nodes. The number of packets before retransmissions is L=100 and the number of retransmissions varies from Q=1 to 25. The packet loss rate is 0.05.

Figure 6:
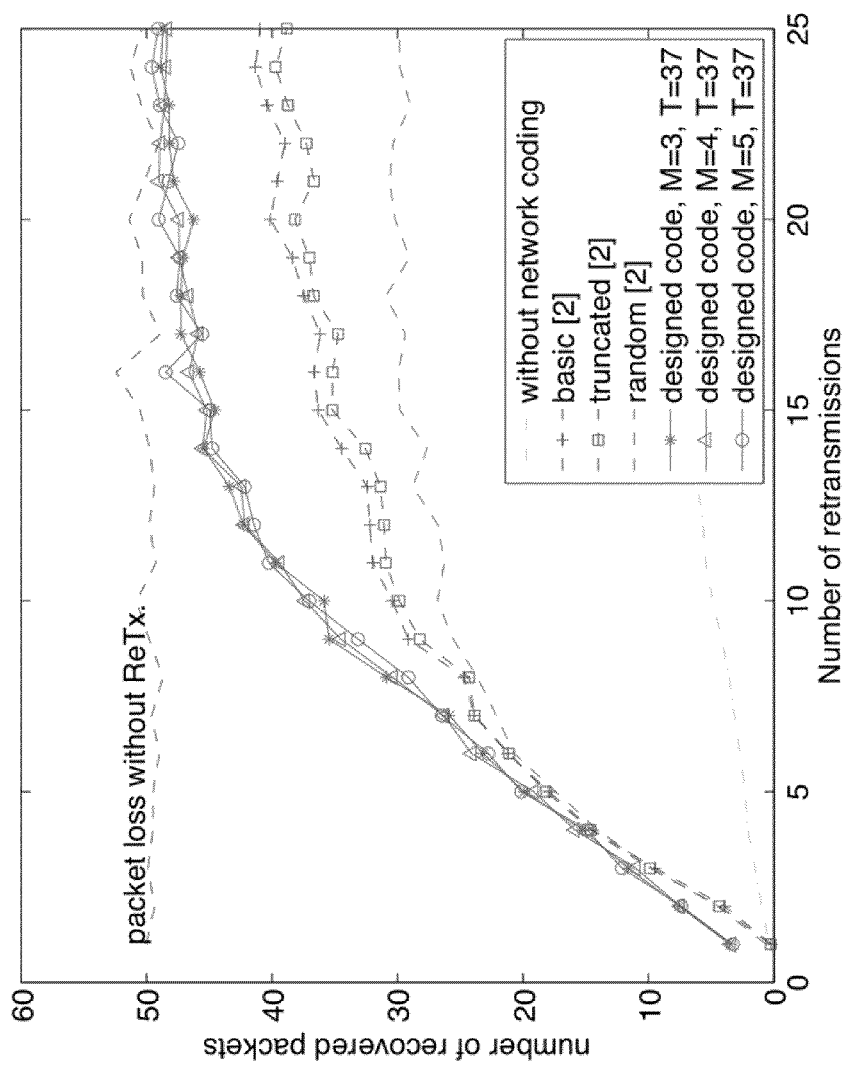
FIG. 6 is graph showing packet recovery performance of retransmissions using a method according to the present disclosure.

FIG. 6 shows a comparison for data recovery performance between the nested coding scheme with designed codes according to an aspect of the present disclosure, and three coding schemes proposed in the art, namely, the basic scheme, the truncated scheme, and the random scheme. For designed code, we set the cyclic shift parameter T=37. The design codes are given by $M=3$: $L^*_3=\{63, 6, 6, 5, 6, 5, 5, 4\}$,
$M=4$: $L^*_4=\{53, 5, 5, 3, 5, 3, 3, 2, 5, 3, 3, 2, 3, 2, 2, 1\}$,
$M=5$: $L^*_5=\{41, 4, 4, 3, 4, 3, 2, 1, 4, 2, 2, 1, 3, 1, 1, 1, 4, 3, 3, 1, 3, 1, 1, 0, 3, 1, 1, 0, 1, 0, 0, 1\}$.

We can see from FIG. 6 that the coding scheme according to the present disclosure performs much better than all three prior art schemes for any number of retransmissions. We find that although the nested coding scheme built with different M, the resulting performance is almost the same.

Figure 7:
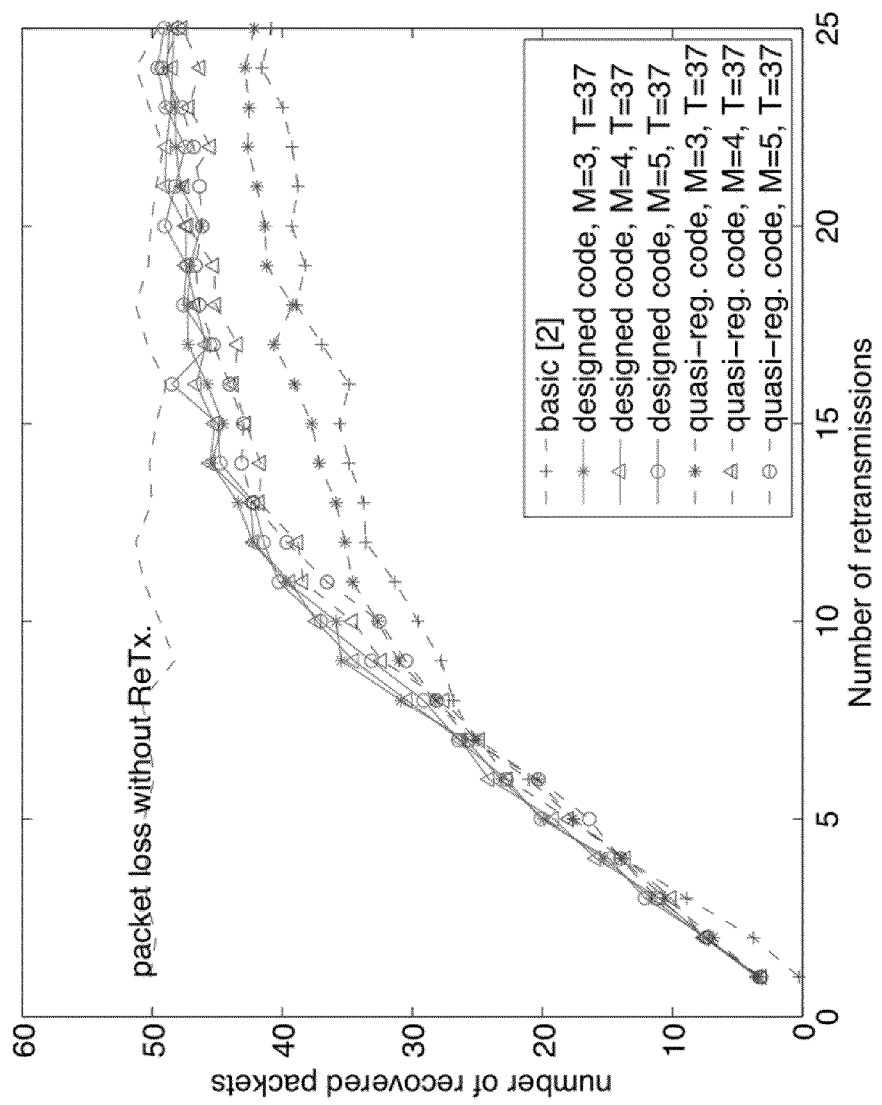
FIG. 7 is a graph showing packet recovery performance of retransmissions using nested coding with quasi-regular codes in multicast broadcast transmissions.

FIG. 7 compares the packet recovery performance between the nested coding scheme with optimized codes and the one with quasi-regular codes. The same system settings as in FIG. 6 are applied. We can see that the nested coding with quasi-regular codes perform close to that with designed codes for $M=4$ and 5. For $M=3$, there is a slight performance degradation, however, it still performs better than the basic coding schemes of the prior art.

As is now apparent to those skilled in the art, we have presented—according to the present disclosure a coding scheme and nested code structure for the retransmissions in multicast broadcast service.

Figure 8:
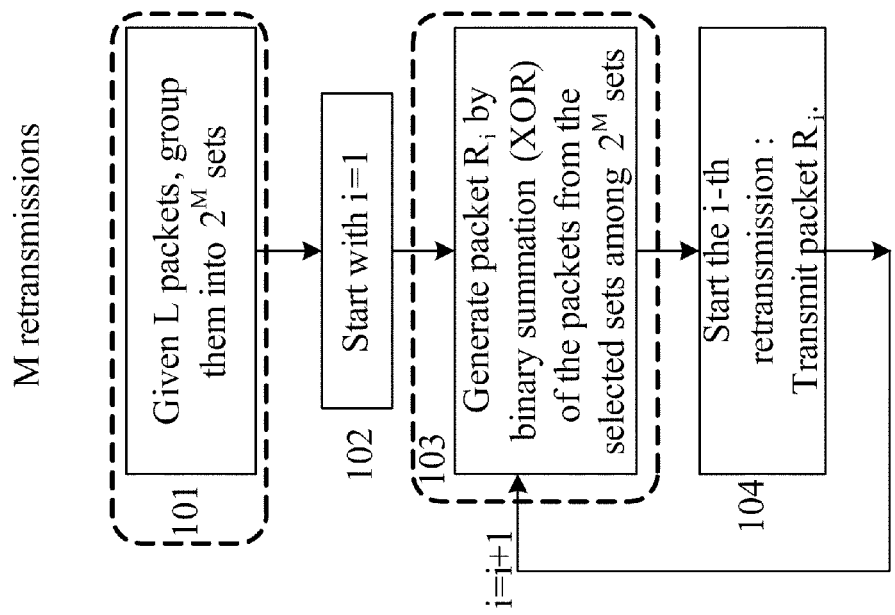
FIG. 8 is a flow diagram showing the generation of packet R, i–1 . . . M for retransmissions in multicast broadcast service according to an aspect of the present disclosure.

A flow diagram showing the generation of packet $R_i$, $i=1, \ldots M$ for retransmissions in multicast broadcast service according to the present disclosure is presented in FIG. 8.

According to the present disclosure, given L original data packets, $P_1, \ldots, P_L$, we encode them to obtain M retransmission packets as follows. At Step 101, we group the original L data packets into $2^M$ sets, i.e., $\Omega_0, \ldots, \Omega_2 M_{-1}$. At step 102, starting from the first retransmission $i=1$, we then at step 103 generate packet $R_i$ for the ith retransmission by binary XORing the packets from the selected sets among the $2^M$ sets. The encoding and selection rules are given by $$R_m = \Sigma \oplus_{P_i \in V_m} P_i, \text{ with } V_m = \{\Omega_j, \text{bin}(m)=1\},$$

where $\Sigma \oplus$ denotes binary summation and $j_{bin}(m)$ denotes the mth bit of binary representation of j. Stated alternatively, $R_m$ is obtained by binary XORing the data packet $P_i$ if $P_i \in \Omega_j$ and the mth bit of binary representation of j is one. Packets in $\Omega_0$ are not encoded to any retransmission packet. Therefore, they are dropped for the retransmission. Finally, at step 104, we transmit packet $R_i$. One example of a graphical representation of encoding is shown in FIG. 2 for $M=2$.

The code design obtains the optimal the grouping for the sets $\Omega_0, \ldots, \Omega_2 M_{-1}$ for a given packet loss rate p. The code design follows the following procedures to minimize error rate, given by:

$$P_{b|M} = \frac{1}{N}\left(\sum_{i=M+1}^{n} iP_i^{(n)} + \sum_{i=0}^{M} \sum_{E} Pr(E|i)P_i^{(n)}n_a(E) + (N-n)p\right).$$

Figure 9:
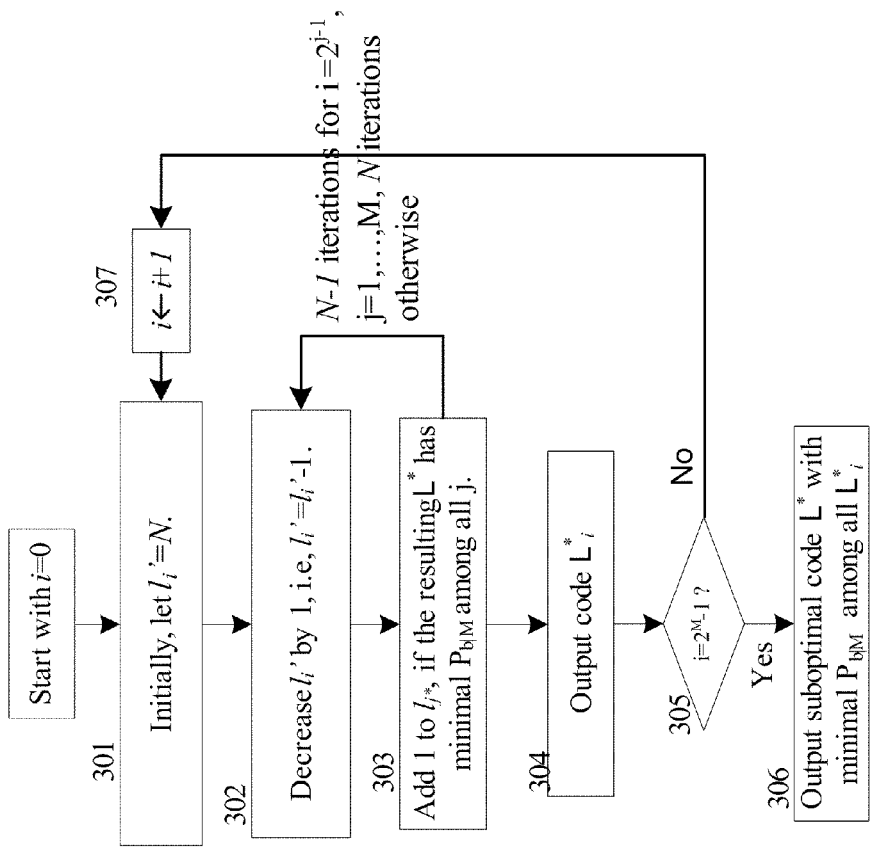
FIG. 9 is a flow diagram showing the generation of code sets according to an aspect of the present disclosure.

FIG. 9 is a flow diagram depicting the low-complexity iterative design method to design the code sets $\Omega_0, \ldots, \Omega_2 M_{-1}$, according to an aspect of the present disclosure.

For those situations where there are more than M retransmissions, a nested coding structure as depicted in FIG. 4 is used. Such a structure is based on cyclic shifts. To obtain the redundant packets with nested code structure, we first fix the order of the packet sequence.

In so doing, we assume that the order packet sequence is $P_1, \ldots, P_L$. Based on the designed graph $\mathcal{L}^*_M = \{l_0 \ldots l_2 M_{-1}\}$, we first group L packets by $$\Omega_j = \{P_{\Sigma_{i=0}^{j-1} l_i + 1}, \ldots, P_{\Sigma_{i=0}^{j} l_i}\}$$

and then encode them to generate M redundant packets based on $\{\Omega_j\}$. To generate additional M redundant packets, we first cyclically shift the ordered packet sequence $P_1, \ldots, P_L$ by T times and obtain packet sequence $P_1^{(1)}, P_L^{(1)}$ with $P_i^{(1)}=P_i+T$ mod L.

We then perform the grouping based on the shifted packet sequence $P_1^{(1)}, \ldots, P_L^{(1)}$ and encode them in the same way based on $\{\Omega_j\}$. As shown in FIG. 4, for every stage of T cyclic shifts, we can generate M redundant packets for retransmissions. By keeping doing the shifts, we can generate as many as redundant packets as we want. Note that there will be repetitions among the redundant packets. If we choose T such that L and T are coprime, we can obtain LM distinct redundant packets.

Figure 10:
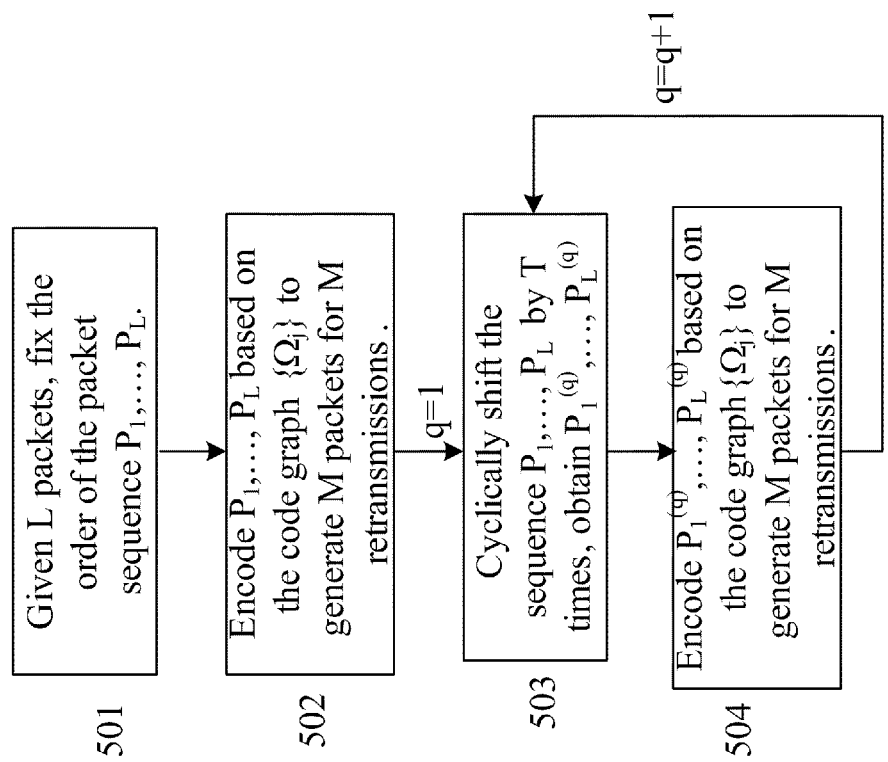
FIG. 10 is a flow diagram for nested encoding based on cyclic shifts according to an aspect of the present disclosure.

A flow diagram depicting nested encoding based on the cyclic shifts is shown in FIG. 10.

At this point, while we have discussed and described the invention using some specific examples, those skilled in the art will recognize that our teachings are not so limited. Accordingly, the invention should be only limited by the scope of the claims attached hereto.

TABLE 1

|  | a | b |
|---|---|---|
| M = 1 | −1.0221 | −0.0956 |
| M = 2 | −1.0263 | 0.1505 |
| M = 3 | −1.0073 | 0.6770 |
| M = 4 | −1.0039 | 0.9348 |
| M = 5 | −0.9704 | 1.2243 |

The invention claimed is:

1. A method for retransmitting L original data packets in a multicast broadcast service comprising the steps of:
   transmitting M coded packets selected from the L original data packets by grouping the L packets into a number of sets according to a predetermined grouping rule;
   generating a retransmission packet $R_i$ through the effect of a binary summation (XOR) of packets selected from the number of sets;
   transmitting packet $R_i$; and
   transmitting any additional coded packets as needed
   wherein said predetermined grouping rule is a fixed one selected from predetermined grouping rules for a given L such that a decoding packet error rate is minimized and no feedback is provided.

2. The method of claim 1 wherein said grouping step groups the L original packets into $2^M$ sets exemplarily denoted as $\Omega_0, \ldots, \Omega_2 M_{-1}$, where M represents a number of retransmission packets.

3. The method of claim 1 wherein said predetermined grouping rule is chosen from predetermined sets of grouping rules for a given L that minimize a decoding packet error rate.

4. The method of claim 2 wherein said generating step comprises the steps of:
   generating the retransmission packet $R_i$ by binary XORing packets from the selected sets from the $2^M$ sets according to the following relationship:

$$R_m = \Sigma \oplus_{P_i \in V_m} P_i, \text{ with } V_m = \{\Omega_j, j_{bin}(m)=1\},$$

where $\Sigma \oplus$ denotes binary summation and $j_{bin}(m)$ denotes the m th bit of the binary representation of j.

5. The method of claim 1 further comprising the steps of:
Encoding $P_1, \ldots, P_L$ based on another code graph thereby generating additional packets for retransmissions.

6. A method for retransmitting L original data packets in a multicast broadcast service comprising the steps of:
- transmitting M coded packets selected from the L original data packets by grouping the L packets into a number of sets according to a predetermined grouping rule;
  - generating a retransmission packet $R_i$ through the effect of a binary summation (XOR) of packets selected from the number of sets;
  - transmitting packet $R_i$;
- transmitting any additional coded packets as needed,
- fixing the L packets into a packet sequence $P_1, \ldots, P_L$; and
- encoding $P_1, \ldots, P_L$ based on a code graph $\{\Omega\}$ thereby generating M packets for M retransmissions.

7. A method for retransmitting L original data packets in a multicast broadcast service comprising the steps of:
- transmitting M coded packets selected from the L original data packets by grouping the L packets into a number of sets according to a predetermined grouping rule;
  - generating a retransmission packet $R_i$ through the effect of a binary summation (XOR) of packets selected from the number of sets;
  - transmitting packet $R_i$;
- transmitting any additional coded packets as needed; and
- encoding $P_1, \ldots, P_L$ based on another code graph thereby generating additional packets for retransmissions.

* * * * *